United States Patent [19]

Gras

[11] Patent Number: 4,500,696
[45] Date of Patent: Feb. 19, 1985

[54] POWDER SURFACE COATINGS

[75] Inventor: Rainer Gras, Bochum, Fed. Rep. of Germany

[73] Assignee: Chemische Werke Huls Aktiengesellschaft, Marl, Fed. Rep. of Germany

[21] Appl. No.: 622,178

[22] Filed: Jun. 19, 1984

[30] Foreign Application Priority Data

Jun. 24, 1983 [DE] Fed. Rep. of Germany ....... 3322719

[51] Int. Cl.³ .............................................. C08G 18/80
[52] U.S. Cl. ........................................................ 528/45
[58] Field of Search .......................................... 528/45

[56] References Cited

U.S. PATENT DOCUMENTS 4,354,014 10/1982 Wolf et al. ............................ 528/45
4,383,076 5/1983 Wolf et al. ............................ 528/45

Primary Examiner—Maurice J. Welsh
Attorney, Agent, or Firm—Oblon, Fisher, Spivak, McClelland & Maier

[57] ABSTRACT

Powder surface coatings of polyols and a polyisocyanate component, wherein blocked adducts of 2-methyl-1,5-pentanediisocyanate, 2-ethyl-1,4-butane diisocyanate or a mixture thereof are used is the polyisocyanate component, according to the formulas (I) and (II):

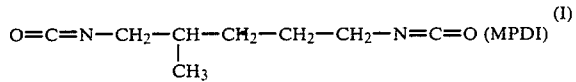

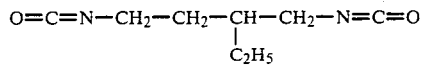

wherein the diisocyanate mixture of (I) and (II) has about 88 to 99% by weight of (I) and about 12 to 1% by weight of (II), and wherein the latent NCO content of the blocked adducts is about 7 to 18% by weight, and the free NCO content is less than or equal to 2% by weight.

14 Claims, No Drawings

POWDER SURFACE COATINGS

BACKGROUND OF THE INVENTION

1. Field of the Invention

This invention relates to new varnish polyisocyanates having isocyanurate or urethane groups, which are blocked by blocking agents, and which have as a base 2-methyl-1,5-pentanediisocyanate (MPDI), 2-ethyl-1,4-butanediisocyanate (EBDI) or a mixture thereof. This invention also relates to the use of these polyisocyanates as an isocyanate component for the production of polyurethane powder varnishes that are thermosetting.

2. Description of the Prior Art

Polyurethane powder varnishes with a base of partially or totally blocked polyisocyanates and polymers exhibiting hydroxyl groups, whose softening point is above 40° C., belong to the state of the art and are described many times in the literature, e.g., in DE-OSS Nos. 21 05 777, 25 42 191, 27 35 497, 28 42 614, 30 04 876, 30 39 824 or 31 28 743.

Polyurethane powder varnishes consist essentially of a component, which carries hydroxyl groups, and a polyisocyanate, whose NCO groups are blocked partially or completely with a blocking agent, so that the OH/NCO polyaddition reaction cannot proceed at temperatures under 140° C. Only after heating to temperatures $\geq 150°$ C. can powder varnishes of this type cross-link within a relevant time with release of the blocking agent and reaction of the OH groups with the NCO groups to form a varnish film.

Not all polyisocyanates are suitable for this purpose and with a view to use as powder materials there are quite a few limitations, especially, when the polyisocyanates, blocked partially or totally with the usual blocking agents, themselves exhibit such characteristics that make grindability difficult. Thus, their use in powder varnishes is limited to a great extent, if indeed not impossible, no matter how good their varnish technical, chemical and physical characteristics may be.

Thus, many attempts have been made to use hexamethylene-1,6-diisocyanate (HDI) and/or its adducts in blocked form for polyurethane varnishes. In DE-OS No. 30 33 860 or EP No. 0 047 452, page 8, it is correctly observed that products with a preponderant portion of HDI (in this case, it is mixed trimers of HDI and isophoronediisocyanate), therefore, in other words, pure HDI trimers, are liquid products at room temperature. It is correctly observed on page 19 that it is impossible to use modified HDI as powder hardening agents exclusively by formation of isocyanurate groups, regardless of the degree of trimerization. A combination of HDI/IPDI was found to be necessary for raising the melting point for use as powder varnishes.

Hence, a need clearly continues to exist for polyisocyanates which, although partially or totally blocked, can be used effectively in polyurethane varnishes. In particular, a need continues to exist for polyisocyanates which, although partially or totally blocked, are produced in a brittle, grindable form which can be used in powder varnishes.

SUMMARY OF THE INVENTION

Accordingly, it is an object of the present invention to provide powder surface coatings containing polyisocyanates which, although partially or totally blocked, can be used effectively in polyurethane varnishes.

In particular, it is an object of this invention to provide powder surface coatings containing polyisocyanates which, although partially or totally blocked, are produced in a brittle grindable form which can be used in powder varnishes as hardening agents.

According to the present invention, the foregoing and other objects are attained by providing powder surface coatings of polyols and polyisocyanates, wherein the polyisocyanate component is made of blocked adducts of 2-methyl-1,5-pentanediisocyanate, 2-ethyl-1,4-butanediisocyanate or a mixture thereof according to formulas (I) and (II)

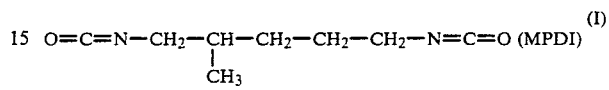

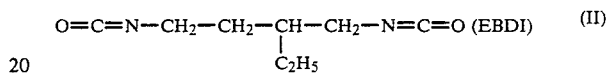

wherein the diisocyanate mixture of (I) and (II) contains about 88 to 97% by weight of (I) and about 12 to 1% by weight of (II), and wherein the latent NCO content of the blocked adducts is about 7 to 18% by weight, and the free NCO content is less than or equal to 2% by weight.

DETAILED DESCRIPTION OF THE PREFERRED EMBODIMENTS

According to the present invention, it has now been surprisingly found that polyisocyanates blocked with blocking agents, particularly ξ-caprolactam or 1H-1,2,4-triazole or a mixture thereof, can be produced from 2-methyl-1,5-pentanediisocyanate (MPDI), 2-ethyl-1,4-butanediisocyanate (EBDI) or a mixture thereof having the following composition:

88–99% by weight of 2-methyl-1,5-pentanediisocyanate (MPDI)

12–1% by weight of 2-ethyl-1,4-butanediisocyanate (EBDI) trimers (isocyanatoisocyanurates), depending on the degree of trimerization, with an NCO content of about 14–21% by weight, preferably about 15.5–19.5% by weight of urethane adducts, on the basis of the reaction with tetra- or higher functional polyols such as ditrimethylolpropane, pentaerythritol, sorbitol, etc. with an NCO content of about 10–22% by weight, preferably about 12–19% by weight. The polyisocyanates are produced in brittle, grindable form that can be used in powder varnishes, along with polyol compounds, especially polyesters containing hydroxyl groups.

The blocked addukts, according to the invention, exhibit a latent NCO content of about 7–18% by weight, preferably about 9.5–16% by weight, and a free NCO content of $\leq 2\%$ by weight, preferably $\leq 1\%$ by weight.

Epoxy resins, acrylates and especially polyesters with a base of predominantly aromatic dicarboxylic acids, diols and triols are suitable polymers carrying hydroxyl groups.

The polyisocyanates and polymers carrying hydroxyl groups, blocked according to the invention, are optionally formulated, by admixture of the usual additives of PUR chemistry, with known technologies for ready-to-use spray powders, applied by electrostatic coating and baked between 140° C. and 250° C., preferably 160° C. and 200° C.

The mixture ratio according to the invention can vary widely. The best varnish technical characteristics are obtained, if the binder ratio consists of 9–45% by weight of cross-linking agent and 91–55% by weight of polyester, whereby the OH/NCO ratio can be set at 1:0.8–1:1.2, preferably 1:0.95–1:1.1. It is particularly recommended to use an equivalent NCO of the cross-linking agent per OH equivalent of polyhydroxyl compound.

Production of the trimers of MPDI or a mixture of MPDI/EBDI is performed in a conventional manner according to GB-PS No. 1 391 066, DE-OSS Nos. 23 25 826, 26 44 684 or 29 16 201. The products of the process consist of isocyanatoisocyanurate with optionally higher oligomers and exhibit an NCO content of about 14–21% by weight, preferably about 15.5–19.5% by weight, which is reduced to an NCO content of $\leq 2\%$ by weight, preferably $\leq 1\%$ by weight of blocking with blocking agents known in the art, especially $\epsilon$-caprolactam and 1H-1,2,4-triazole.

Trimerization can be performed in substance or in inert organic solvent. The catalytic reaction should be stopped as soon as the NCO content of the mixture indicates that 30–50% of the NCO groups have reacted. The unreacted diisocyanate is then separated with the catalyst and optionally with the solvents.

The products of the process can be produced on the basis of tetra- or higher functional polyols, such as di-trimethylolpropane, pentaerythritol, sorbitol, etc., in combination with MPDI or the MPDI/EBDI mixture. They exhibit an NCO content, before reaction with blocking agents, of 10–22% by weight, preferably 12–19% by weight, and after blocking, of $\leq 2\%$ by weight, preferably $\leq 1\%$ by weight. The reactants are reacted in such weight ratios that 0.8–1 NCO group of polyisocyanate is reacted per OH group of polyol.

The isocyanate component is introduced and the blocking agent is added in portions to perform the blocking reaction. The reaction occurs at temperatures below the separation temperature at 90°–130° C. Also catalysts, in an amount of 0.001–1% by weight, relative to the total mixture, which are customary in PUR-chemistry can be added for the isocyanate polyaddition reaction.

For example, phenols, alcohols, ethylacetoacetate, lactams, especially $\epsilon$-caprolactam, and triazoles, especially 1H-1,2,4-triazole which raises the melting point, are suitable blocking agents.

The products according to the invention, in their use as cross-linking agents for polyurethane powder varnishes, are combined with the usual resins for powder varnishes with a polyurethane base, i.e., preferably with resins containing hydroxyl groups.

Suitable resins containing hydroxyl groups are especially polyesters, epoxy resins and acrylates, which contain hydroxyl groups, with a molecular weight of about 800–10,000 preferably about 1,200–5,000, with a hydroxyl number of 20–150 mg KOH/g, preferably 30–100 mg KOH/g, and melting points above 60° C., preferably between 70° C. and 100° C.

The polyesters of terephtalic acid with the alcohols hexamethylene glycol, neopentyl glycol, 1,4-dimethanolcyclohexane and 2,2,2-trimethylolpropane are suitable for production of powder varnishes.

Usable epoxy resins are indicated in DE-OS No. 29 45 113, page 12, line 1 to page 13, line 26.

Suitable polyacrylates are described in DE-OS No. 30 30 539, page 14, line 21 to page 15, line 26.

The resins containing hydroxyl groups are used in such amounts that the OH/NCO ratio is 1:0.8–1:1.2, preferably 1:0.95–1:1.1. When epoxies are used an OH/NCO ratio of 1:0.25–1:0.75, preferably 1:0.35–1:0.55 is recommended.

The usual adjuvants and additives include leveling agents, pigments, dyes, fillers, catalysts, thixotropic agents, UV and oxidation stabilizers. The amount of these materials can vary broadly, relative to the amount of solid binder.

Production of the powder coating is performed, e.g, as follows: the solid resins, polyester and/or epoxy resin and/or acrylic resin and the blocked polyisocyanates, optionally in combination with the necessary additives, are mixed in said amounts ratios and extruded at raised temperature. This temperature must be above the melting point of the polyester/epoxy/acrylate or blocked polyisocyanate, or below the decomposition temperature of the cross-linking agents.

After extrusion it is cooled and ground to a grain size less than 0.25 mm, preferably <100 $\mu$m. Then, the larger fractions are removed by sifting and returned to the mill.

Application of the ready-to-spray powder to the bodies to be coated can be performed by known methods, e.g., by electrostatic powder spraying or electrostatic fluid-bed powder sintering. Then the enameled objects are baked for 60 minutes to 1 minute in a temperature range of 140° to 250° C., preferably 30 to 8 minutes between 160° C. and 200° C.

All substrates, which tolerate the specific hardening conditions without loss of mechanical properties, e.g., metals, glass, ceramics or plastics, are suitable for coating with the powder surface coatings according to the invention.

The resulting polyurethane powder varnishes, in comparison with known ones, are marked by improved properties toward heat, UV and chemical influences.

The present invention will be further illustrated by certain examples and references which are provided for purposes of illustration only and are not intended to limit the present invention.

A. Production of Blocked Polyisocyanates

Example 1

1,000 parts by weight of MPDI/EBDI mixture (94:6) and 0.1 part by weight of catalyst (triethylenediamine/propylene oxide 1:1) were mixed at 80° C. with vigorous stirring. A heat tonality resulted immediately, whereby the temperature of the reaction mixture rose to about 95° C. The reaction mixture was heated for 20 minutes longer at this temperature. During this time, the NCO content dropped to 37.5% by weight. The reaction mixture was distilled in a thin-layer evaporator at 160° C./0.1 torr to remove the unreacted diisocyanate mixture. The reaction product—isocyanatoisocyanurate (residue of the thin-layer evaporation)—had an NCO content of 19.3% by weight and a monomer content of <0.7% by weight.

(1a) Blocking of 300 parts by weight of isocyanatoisocyanurate with 156.1 parts by weight of $\epsilon$-caprolactam at 90°–130° C. leads to a brittle, grindable product with a melting range of 58°–62° C. The free NCO content was <0.6% by weight and a latent NCO content (practical) of 12.2% by weight.

(1b) Blocking of 200 parts by weight of isocyanatoisocyanurate with 1H-1,2,4-triazole at 90°–130° C. yielded a brittle, grindable solid product with a melting range of 65°–70° C. The free NCO content was <1% by weight and latent (practical) NCO content 14.1% by weight.

Example 2

Analogously to the process described in example 1, 500 parts by weight of MPDI/EBDI mixture (94:6) were trimerized to an NCO content of 34.5% by weight. The isocyanatoisocyanurate isolated after thin-layer distillation had an NCO content of 17.3% by weight and a monomer content of <0.7% by weight.

(2a) Blocking of 250 parts by weight of isocyanatoisocyanurate with 116.5% by weight of ε-caprolactam at 90°–130° C. yielded a brittle, grindable solid with a melting range of 69°–74° C. The free NCO content was <0.7% by weight and the practical latent NCO content was 11.5% by weight.

Example 3 (Comparison)

Analogously to the process described in example 1, 500 parts by weight of HDI were trimerized. The isolated isocyanatoisocyanurate had a monomer content of <0.4% by weight and an NCO content of 19.5% by weight.

(3e) The isocyanatoisocyanurate was blocked with a stoichiometric amount of ε-caprolactam as in example 1a. The resulting product was soft at room temperature, tacky, not grindable and therefore unsuitable for use in powder varnish.

(3b) The isocyanatoisocyanurate was blocked with a stoichiometric amount of 1H-1,2,4-triazole according to example 1b. The resulting product had a melting range of 20°–25° C. and therefore was not grindable; use in powder varnish was not possible.

Example 4 (Comparison)

134 parts by weight of trimethylolpropane were added in portions at 80° C. to 1,344 parts by weight of MPDI/EBDI mixture with vigorous stirring. After the addition, the reaction mixture was heated for an hour longer at 100° C. and then the reacted diisocyanate was removed by thin-layer distillation at 160° C./0.1 torr. The reaction product residue had an NCO content of 18.7% by weight and a monomer content of <0.6% by weight.

(4a) Blocking of the product of the process with a stoichiometric amount of ε-caprolactam leads to a brittle solid product with a melting range of 42°–46° C. The free NCO content was <0.7%, the practical latent NCO content was 12.4% by weight. The ground cross-linking agent reagglomerated after a short time and therefore could not be used in powder varnish.

Example 5 (Comparison)

The similar product according to example 4 with a base of HDI was soft at room temperature, tacky and not grindable.

Example 6

136 parts by weight of pentaerythritol, as in Example 4, in 1,344 parts by weight of MPDI/EBDI mixture, with use of 0.05% by weight of DBTL, were brought to reaction at 120°–140° C. After thin-layer distillation a prepolymer was obtained with a monomer content of <0.7% by weight and an NCO content of 15.2% by weight.

(6a) Blocking of the product of the process with a stoichiometric amount of ε-caprolactam led to a brittle solid with a melting range of 57°–61° C. The free NCO content was <0.5% by weight and the practical latent NCO content was 10.7% by weight.

Example 7

125 parts by weight of di-TMP (dimer trimethylolpropane), as in Example 4, in 672 parts by weight of MPDI/EBDI mixture were brought to reaction at 80°–100° C. After thin-layer distillation a prepolymer with monomer content of <0.7% by weight and an NCO content of 17.0% by weight isolated.

(7a) Blocking of the product of the process with a stoichiometric amount of ε-caprolactam leads to a grindable solid with a melting range of 59°–64° C. The free NCO content was <0.6% by weight and the practical latent NCO content 11.7% by weight.

B. Polyol Component

General Production Instructions

The initial components—terephthalic acid (TA), dimethyl terephthalate (DMT), hexamethylene glycol (HMG), neopentyl glycol (NPG), 1,4-dimethylolcyclohexane (DMC) and trimethylolpropane (TMP)—were put in a reactor and heated with an oil bath. After most of the material had melted, 0.05% by weight of di-n-butyltinoxide was added as a catalyst at a temperature of 160° C. The first methyl alcohol separation occurred at a temperature of 170° C. The temperature was raised to 220°–230° C. within 6–8 hours and the reaction was brought to an end in another 12–15 hours. The polyester was cooled to 200° C. and the volatile portion was freed to a large extent by creation of a vacuum (1 mm Hg) within 30–45 minutes. During the entire reaction time, the bottom product was stirred and a week $N_2$ current was passed through the reaction mixture.

The following table gives the polyester compositions and the corresponding physical and chemical characteristics.

| Examples | 1 | 2 | 3 |
|---|---|---|---|
| TA Mol | 9 | 6 | 8 |
| DMT Mol | 9 | 6 | 7 |
| HMG Mol | 3 | 4 | 3 |
| NPG Mol | 13 | 5 | 10 |
| DMC Mol | 3 | 3 | 2 |
| TMP Mol | 1 | 1 | 1 |
| OH—number mgKOH/g | 50–56 | 48–52 | 32–36 |
| Acid number mgKOH/g | 3–4 | 3–4 | 3–4 |
| Melting point °C. | ca. 70 | ca. 80 | ca. 85 |
| Second order transition temperatures (DTA) °C. | ca. 50 | ca. 55 | ca. 60 |
| Viscosity at 160° C. mPa's | ~10,000 | ~15,000 | ~40,000 |

C. Polyurethane Powder Varnish

General Production Instructions

The ground products—cross-linking agent, polyester, leveling agent*—Masterbatch—are intimately mixed in an edge mill, optionally with white pigment and optionally with fillers, and then homogenized in an extruder at 100°–130° C. After cooling, the extrudate is broken and ground in a disk mill to a grain size of <100 μm. The powder, thus produced, is applied with electrostatic powder spraying equipment at 60 KV to degreased, optionally pretreated sheet iron and baked in a recirculated air drying box at temperature between 160° and 200° C.

*Leveling agent-Masterbatch: 10% by weight of leveling agent—a commercial copolymer of butyl-acrylate and 2-ethylhexyl-acrylate—is homogenized in the corresponding polyester in the melt and ground after hardening.

The abbreviations used in the following tables are:

| | | |
|---|---|---|
| LT | layer thickness in μm | |
| HK | hardness according to Koenig in sec | (DIN 53 157) |
| HB | hardness according to Buchholz | (DIN 53 153) |
| ET | Erichsen test in mm | (DIN 53 156) |
| CT | cross-out test | (DIN 53 151) |
| GG 60° ∢ | measurement of gloss according to Gardner | (ASTM-D 523) |

Imp. rev. impact reverse in inch lb

EXAMPLE 1

Pigmented Varnish

The powder varnish of the process was produced with the following formulation, applied and baked between 160° and 200° C.

391.9 parts by weight polyester according to example B1
158.1 parts by weight cross-linking agent according to example A 1a
400.0 parts by weight white pigment (TiO$_2$)
50.0 parts by weight leveling agent—Masterbatch.

| Baking conditions Time/temperature min/°C. | Mechanical Characteristics | | | | | | |
|---|---|---|---|---|---|---|---|
| | LT | HK | HB | ET | CT | Imp. rev. | GG 60° ∢ |
| 6/200 | 70–85 | 170 | 100 | 9.3–9.9 | 0 | 60 | 88 |
| 8/200 | 80 | 175 | 111 | >10 | 0 | >82 | 86 |
| 10/200 | 60–70 | 173 | 100 | >10 | 0 | >82 | 89 |
| 15/180 | 60–70 | 170 | 111 | >10 | 0 | >82 | 87 |
| 20/180 | 70 | 174 | 111 | >10 | 0 | >82 | 90 |
| 25/180 | 75–85 | 170 | 100 | >10 | 0 | >82 | 89 |
| 25/170 | 70 | 171 | 100 | 9.4–9.8 | 0 | 70 | 87 |
| 30/170 | 70–80 | 171 | 111 | >10 | 0 | >82 | 89 |
| 35/160 | 75–85 | 170 | 100 | 9.0–9.5 | 0 | 60 | 90 |

EXAMPLE 2

Pigmented Varnish

The powder varnish of the process was produced with the following formulation, applied and baked between 160° and 200° C.

488.7 parts by weight polyester according to example B2
171.3 parts by weight cross-linking agent according to Example A 1a
480.0 parts by weight white pigment (TiO$_2$)
60.0 parts by weight leveling agent—Masterbatch

| Baking conditions Time/temperature min/°C. | Mechanical Characteristics | | | | | | |
|---|---|---|---|---|---|---|---|
| | LT | HK | HB | ET | CT | Imp. rev. | GG 60° ∢ |
| 6/200 | 70–80 | 170 | 100 | 9.1–9.6 | 0 | 70 | 88 |
| 8/200 | 85–95 | 174 | 100 | >10 | 0 | >82 | 90 |
| 10/200 | 80 | 171 | 111 | >10 | 0 | >82 | 89 |
| 15/180 | 65–75 | 170 | 100 | 8.7–9.5 | 0 | 60 | 90 |
| 20/180 | 70–80 | 173 | 100 | >10 | 0 | >82 | 91 |
| 25/180 | 60–70 | 175 | 100 | >10 | 0 | 70 | 89 |
| 25/170 | 70–80 | 170 | 100 | 8.5–9.1 | 0 | 70 | 88 |
| 30/170 | 75–85 | 172 | 111 | 9.7–10.0 | 0 | >82 | 86 |
| 35/160 | 80–95 | 170 | 100 | 8.4–8.9 | 0 | 40 | 89 |

EXAMPLE 3

Pigmented Varnish

The powder varnish of the process was produced with the following formulation, applied and baked between 160° and 200° C.

287.9 parts by weight polyester according to Example B1
100.0 parts by weight cross-linking agent according to Example A 1b
282.2 parts by weight white pigment (TiO$_2$)
35.3 parts by weight leveling agent—Masterbatch.

| Baking conditions Time/temperature min/°C. | Mechanical Characteristics | | | | | | |
|---|---|---|---|---|---|---|---|
| | LT | HK | HB | ET | CT | Imp. rev. | GG 60° ∢ |
| 6/200 | 60–70 | 170 | 100 | 9.2–9.9 | 0 | 70 | 88 |
| 8/200 | 70–80 | 169 | 100 | 9.4–10.5 | 0 | >82 | 91 |
| 10/200 | 80 | 171 | 100 | >10 | 0 | >82 | 87 |
| 15/180 | 75–85 | 172 | 100 | >10 | 0 | >82 | 88 |
| 20/180 | 60–70 | 170 | 111 | >10 | 0 | >82 | 90 |
| 25/180 | 70–80 | 170 | 100 | >10 | 0 | 70 | 88 |
| 25/170 | 70–80 | 172 | 100 | 9.7–9.9 | 0 | 60 | 87 |
| 30/170 | 60–70 | 170 | 100 | 9.4–9.8 | 0 | >82 | 90 |
| 35/160 | 75 | 169 | 111 | 9.2–9.7 | 0 | 70 | 91 |

EXAMPLE 4

Pigmented Varnish

The powder varnish of the process was produced with the following formulation, applied and baked between 160° and 200° C.

507 parts by weight polyester according to Example B2
153 parts by weight cross-linking agent according to Example A 1b
480 parts by weight white pigment (TiO$_2$)
60 parts by weight leveling agent—Masterbatch.

| Baking conditions Time/temperature min/°C. | Mechanical Characteristics | | | | | | |
|---|---|---|---|---|---|---|---|
| | LT | HK | HB | ET | CT | Imp. rev. | GG 60° ∢ |
| 6/200 | 70–80 | 169 | 100 | 9.2–9.9 | 0 | 60 | 88 |
| 8/200 | 70–80 | 172 | 100 | 9.8–10.4 | 0 | 70 | 90 |
| 10/200 | 60–85 | 170 | 100 | >10 | 0 | >82 | 91 |
| 15/180 | 80 | 171 | 100 | 9.5–10.1 | 0 | >82 | 87 |
| 20/180 | 75–85 | 174 | 111 | >10 | 0 | >82 | 89 |
| 25/180 | 70–80 | 170 | 100 | >10 | 0 | >82 | 88 |
| 25/170 | 60–70 | 168 | 100 | 9.1–9.4 | 0 | 60 | 90 |
| 30/170 | 70–80 | 171 | 111 | 9.7–10.1 | 0 | 70 | 91 |
| 35/160 | 70–80 | 170 | 100 | 8.5–9.2 | 0 | 60 | 91 |

EXAMPLE 5

Pigmented Varnish

The powder varnish of the process was produced with the following formulation, applied and baked between 160° and 200° C.

463.1 parts by weight polyester according to Example B1
196.9 parts by weight cross-linking agent according to Example A 2a
480.0 parts by weight white pigment (TiO$_2$)
60.0 parts by weight leveling agent—Masterbatch.

| Baking conditions Time/temperature min/°C. | Mechanical Characteristics | | | | | | |
|---|---|---|---|---|---|---|---|
| | LT | HK | HB | ET | CT | Imp. rev. | GG 60° ≮ |
| 6/200 | 70-90 | 169 | 100 | 9.9-10.1 | 0 | 70 | 87 |
| 8/200 | 75-85 | 174 | 100 | <10 | 0 | >82 | 92 |
| 10/200 | 85 | 170 | 111 | >10 | 0 | >82 | 89 |
| 15/180 | 70-80 | 171 | 100 | 9.4-9.7 | 0 | 60 | 90 |
| 20/180 | 75-85 | 174 | 111 | >10 | 0 | >82 | 89 |
| 25/180 | 70-85 | 170 | 100 | >10 | 0 | >82 | 89 |
| 25/170 | 60-75 | 168 | 100 | 9.1-9.4 | 0 | 60 | 91 |
| 30/170 | 70 | 172 | 100 | >10 | 0 | >82 | 90 |
| 35/160 | 85-90 | 170 | 100 | 8.7-9.2 | 0 | 50 | 90 |

EXAMPLE 6

Pigmented Varnish

The powder varnish of the process was produced with the following formulation, applied and baked between 160° and 200° C.

520.2 parts by weight polyester according to Example B3
139.8 parts by weight cross-linking agent according to Example A 2a
480.0 parts by weight white pigment (TiO$_2$)
60.0 parts by weight leveling agent—Masterbatch.

| Baking conditions Time/temperature min/°C. | Mechanical Characteristics | | | | | | |
|---|---|---|---|---|---|---|---|
| | LT | HK | HB | ET | CT | Imp. rev. | GG 60° ≮ |
| 6/200 | 70 | 167 | 100 | 8.9-9.2 | 0 | 50 | 85 |
| 8/200 | 70-80 | 170 | 100 | 9.4-9.9 | 0 | 70 | 87 |
| 10/200 | 60-75 | 172 | 100 | >10 | 0 | >82 | 89 |
| 15/180 | 80 | 170 | 100 | 8.7-9.0 | 0 | 50 | 88 |
| 20/180 | 80-90 | 173 | 111 | 9.2-9.7 | 0 | 60 | 90 |
| 25/180 | 75-85 | 169 | 100 | 9.8-10.2 | 0 | 70 | 87 |
| 25/170 | 70-85 | 170 | 111 | 8.7-8.9 | 0 | 40 | 87 |
| 30/170 | 75-90 | 171 | 100 | 9.5-9.7 | 0 | 60 | 88 |
| 35/160 | 85 | 169 | 100 | 8.4-8.9 | 0 | 40 | 89 |

EXAMPLE 7

Pigmented Varnish

The powder varnish of the process was produced with the following formulation, applied and baked between 160° and 200° C.

376.4 parts by weight polyester according to Example B1
173.6 parts by weight cross-linking agent according to Example A 6a
400.0 parts by weight white pigment (TiO$_2$)
50.0 parts by weight leveling agent—Masterbatch.

| Baking conditions Time/temperature min/°C. | Mechanical Characteristics | | | | | | |
|---|---|---|---|---|---|---|---|
| | LT | HK | HB | ET | CT | Imp. rev. | GG 60° ≮ |
| 6/200 | 80-90 | 169 | 100 | 7.9-8.7 | 0 | 40 | 80 |
| 8/200 | 80-90 | 173 | 100 | 9.5-10.1 | 0 | 60 | 75 |
| 10/200 | 70-75 | 170 | 111 | >10 | 0 | 70 | 79 |
| 15/180 | 80-90 | 168 | 111 | 5.9-7.3 | 0 | 20 | 84 |
| 20/180 | 80 | 172 | 100 | 7.4-7.7 | 0 | 50 | 83 |
| 25/180 | 85-95 | 170 | 100 | 8.4-9.1 | 0 | 60 | 79 |
| 25/170 | 75-85 | 171 | 100 | 4.3-5.1 | 0 | 10 | 80 |
| 30/170 | 90 | 173 | 111 | 5.7-6.9 | 0 | 30 | 82 |
| 35/160 | 85-95 | 169 | 100 | 4.4-5.1 | 0 | 10 | 83 |

EXAMPLE 8

Pigmented Varnish

The powder varnish of the process was produced with the following formulation, applied and baked between 160° and 200° C.

511.2 parts by weight polyester according to Example B3
148.8 parts by weight cross-linking agent according to Example A 6a
480.0 parts by weight white pigment (TiO$_2$)
60.0 parts by weight leveling agent—Masterbatch.

| Baking conditions Time/temperature min/°C. | Mechanical Characteristics | | | | | | |
|---|---|---|---|---|---|---|---|
| | LT | HK | HB | ET | CT | Imp. rev. | GG 60° ≮ |
| 6/200 | 70 | 169 | 100 | 6.9-7.5 | 0 | 20 | 77 |
| 8/200 | 85-95 | 174 | 100 | 7.7-8.4 | 0 | 50 | 80 |
| 10/200 | 80-90 | 170 | 111 | 7.3-8.9 | 0 | 60 | 79 |
| 15/180 | 75-90 | 170 | 100 | 7.1-7.8 | 0 | 30 | 82 |
| 20/180 | 85-95 | 172 | 111 | 6.9-7.9 | 0 | 60 | 77 |
| 25/180 | 90 | 174 | 100 | 7.4-8.1 | 0 | 50 | 78 |
| 25/170 | 80-90 | 169 | 100 | 4.1-4.9 | 0 | 40 | 79 |
| 30/170 | 80-90 | 169 | 100 | 5.3-6.7 | 0 | 50 | 80 |
| 35/160 | 95-100 | 170 | 100 | 4.6-5.2 | 0 | 30 | 79 |

EXAMPLE 9

Pigmented Varnish

The powder varnish of the process was produced with the following formulation, applied and baked between 160° and 200° C.

484.3 parts by weight polyester according to Example B2
175.7 parts by weight cross-linking agent according to Example A 7a
480.0 parts by weight white pigment (TiO$_2$)
60.0 parts by weight leveling agent—Masterbatch.

| Baking conditions Time/temperature min/°C. | Mechanical Characteristics | | | | | | |
|---|---|---|---|---|---|---|---|
| | LT | HK | HB | ET | CT | Imp. rev. | GG 60° ≮ |
| 6/200 | 80-85 | 169 | 100 | 8.7-9.2 | 0 | 50 | 85 |
| 8/200 | 90 | 170 | 100 | 9.2-9.5 | 0 | 60 | 84 |
| 10/200 | 80-90 | 174 | 100 | 9.0-9.3 | 0 | 60 | 80 |
| 15/180 | 70-85 | 169 | 100 | 7.5-8.2 | 0 | 40 | 84 |
| 20/180 | 85 | 174 | 100 | 7.9-8.7 | 0 | 30 | 82 |
| 25/180 | 75-90 | 172 | 100 | 8.0-8.9 | 0 | 60 | 86 |
| 25/170 | 80-95 | 171 | 100 | 5.2-6.0 | 0 | 30 | 84 |
| 30/170 | 70-90 | 174 | 100 | 5.7 | 0 | 30 | 80 |

| Baking conditions Time/temperature min/°C | Mechanical Characteristics | | | | | | |
|---|---|---|---|---|---|---|---|
| | LT | HK | HB | ET | CT | Imp. rev. | GG 60° ≮ |
| 35/160 | 80–95 | 169 | 100 | 4.9–5.9 | 0 | 20 | 84 |

EXAMPLE 10

Pigmented Varnish

The powder varnish of the process was produced with the following formulation, applied and baked between 160° and 200° C.

522.1 parts by weight polyester according to Example B3
137.9 parts by weight cross-linking agent according to Example A 7a
480.0 parts by weight white pigment (TiO$_2$)
60.0 parts by weight leveling agent—Masterbatch.

| Baking conditions Time/temperature min/°C | Mechanical Characteristics | | | | | | |
|---|---|---|---|---|---|---|---|
| | LT | HK | HB | ET | CT | Imp. rev. | GG 60° ≮ |
| 6/200 | 70–90 | 168 | 100 | 8.1–8.8 | 0 | 40 | 83 |
| 8/200 | 85 | 174 | 100 | 8.5–8.9 | 0 | 60 | 86 |
| 10/200 | 80–90 | 170 | 100 | 8.7–9.1 | 0 | 50 | 82 |
| 15/180 | 80–90 | 170 | 100 | 7.2–7.9 | 0 | 30 | 80 |
| 20/180 | 70–85 | 173 | 100 | 7.4–7.8 | 0 | 70 | 84 |
| 25/180 | 60–75 | 169 | 100 | 8.2–8.8 | 0 | 60 | 81 |
| 25/170 | 60–70 | 169 | 100 | 5.4–5.9 | 0 | 30 | 84 |
| 30/170 | 70–85 | 172 | 100 | 5.7–6.7 | 0 | 50 | 83 |
| 35/160 | 85–90 | 168 | 100 | 4.9–5.3 | 0 | 20 | 82 |

D. Epoxy Resin Powder Varnish

D1. Epoxy resin used for production of powder varnish

Two epoxy resins with a base of an adduct of 2,2-bis-(4-hydroxylphenyl)-propane (Dian) and epichlorohydrin were used, the first was subjected to an HCl separation and then reacted with more Dian.

According to the manufacturer, the epoxy resins had the following physical characteristics:

D 1.1

EP equivalent weight: 900–1,000
EP value: 0.10–0.11
OH value: 0.34
Melting range: 96°–104° C.

D 1.2

EP equivalent weight: 1,700–2,000
EP value: 0.05–0.059
OH value: 0.36
Melting range: 125°–132° C.

EXAMPLE D 1.3

Pigmented Varnish

The powder varnish of the process described in example C was produced with the following formulation, applied and baked between 180° and 200° C.

109.8 parts by weight epoxy according to example D 1.2
87.2 parts by weight epoxy according to example D 1.1
128.0 parts by weight cross-linking agent according to example A 1
150.0 parts by weight white pigment (TiO$_2$)
25.0 parts by weight leveling agent—Masterbatch (10% Modaflow in epoxy according to example D 1.1).

| Baking conditions time/temperature min/°C | Mechanical Characteristics | | | | | | |
|---|---|---|---|---|---|---|---|
| | LT | HK | HB | ET | CT | Imp. rev. | GG 60° ≮ |
| 15/200 | 60 | 192 | 111 | 7.1–8.0 | 0 | 50 | 85 |
| 20/200 | 70–80 | 191 | 125 | 7.2–8.3 | 0 | 60 | 85 |
| 25/180 | 60–70 | 195 | 111 | 5.5–6.5 | 0 | 30 | 88 |
| 30/180 | 70–85 | 197 | 111 | 5.8–6.9 | 0 | 40 | 87 |

Having now fully described this invention, it will be apparent to one of ordinary skill in the art that many changes and modifications can be made thereto without departing from the spirit or scope of the invention as set forth herein.

What is claimed as new and desired to be secured by Letters Patent of the United States is:

1. Powder surface coatings comprising polyols and a polyisocyanate component, wherein said polyisocyanate component comprises blocked adducts of 2-methyl-1,5-pentanediisocyanate, 2-ethyl-1,4-butanediisocyanate or a mixture thereof according to formulas (I) and (II):

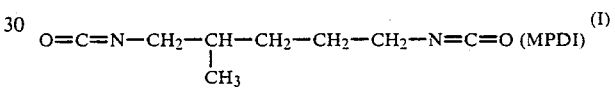

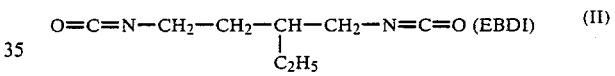

wherein the diisocyanate mixture of (I) and (II) has about 88 to 99% by weight of (I) and about 12 to 1% by weight of (II), and wherein the latent NCO content of said blocked adducts is about 7 to 18% by weight, and the free NCO content is less than or equal to 2% by weight.

2. The powder surface coatings of claim 1, wherein said latent NCO content of said blocked adducts is about 9.5 to 16% by weight, and the free NCO content of less than or equal to 1% by weight.

3. The powder surface coatings of claim 1, wherein said adduct is the trimer of MPDI or MPDI/EBDI mixture, having a NCO content of about 14 to 21% by weight.

4. The powder surface coatings of claim 3, wherein said adduct is the trimer of MPDI or MPDI/EBDI mixture, having a NCO content of about 15.5 to 19.5% by weight.

5. The powder surface coatings of claim 1, wherein said adduct is the reaction product of MPDI or MPDI/EBDI mixture with tetra or higher functional polyols and has a NCO content of about 10 to 22% by weight.

6. The powder surface coatings of claim 6, wherein said adduct is the reaction product of MPDI or MPDI/EBDI mixture with tetra or higher functional polyols and has a NCO content of about 12 to 19% by weight.

7. The powder surface coatings of claim 1, wherein the binder ratio is about 9 to 45% by weight of MPDI or MPDI/EBDI adduct and about 91 to 55% by weight of polyester containing hydroxyl groups, wherein the OH/NCO ratio is about 1:0.8 to 1:1.2.

8. The powder surface coatings of claim 7, wherein the OH/NCO ratio is about 1:0.95 to 1:1.1.

9. The powder surface coatings of claim 1, wherein said polyol component is an epoxy and the OH/NCO ratio is about 1:0.25 to 1:0.75.

10. The powder surface coatings of claim 9, wherein the OH/NCO ratio is about 1:0.35 to 1:0.55.

11. The powder surface coatings of claim 1, wherein said polyisocyanate component is blocked with ε-caprolactam and 1H-1,2,4-triazole.

12. The powder surface coatings of claim 1, wherein said polyols comprise polyesters, epoxy resins and acrylates having hydroxyl groups, having a molecular weight of about 800 to 10,000.

13. The powder surface coatings of claim 12, wherein said polyesters are the polyesters of terephthalic acid with the alcohols hexamethylene glycol, neopentyl glycol, 1,4-dimethanolcyclohexane and 2,2,2-trimethylolpropane.

14. The powder surface coatings of claim 5, wherein said tetra or higher functional polyols are ditrimethylolpropane, pentaerythritol and sorbitol.

* * * * *